March 21, 1961     D. J. NELSON     2,975,784
ACCESSORY FOR BLOW TORCH
Filed June 30, 1958
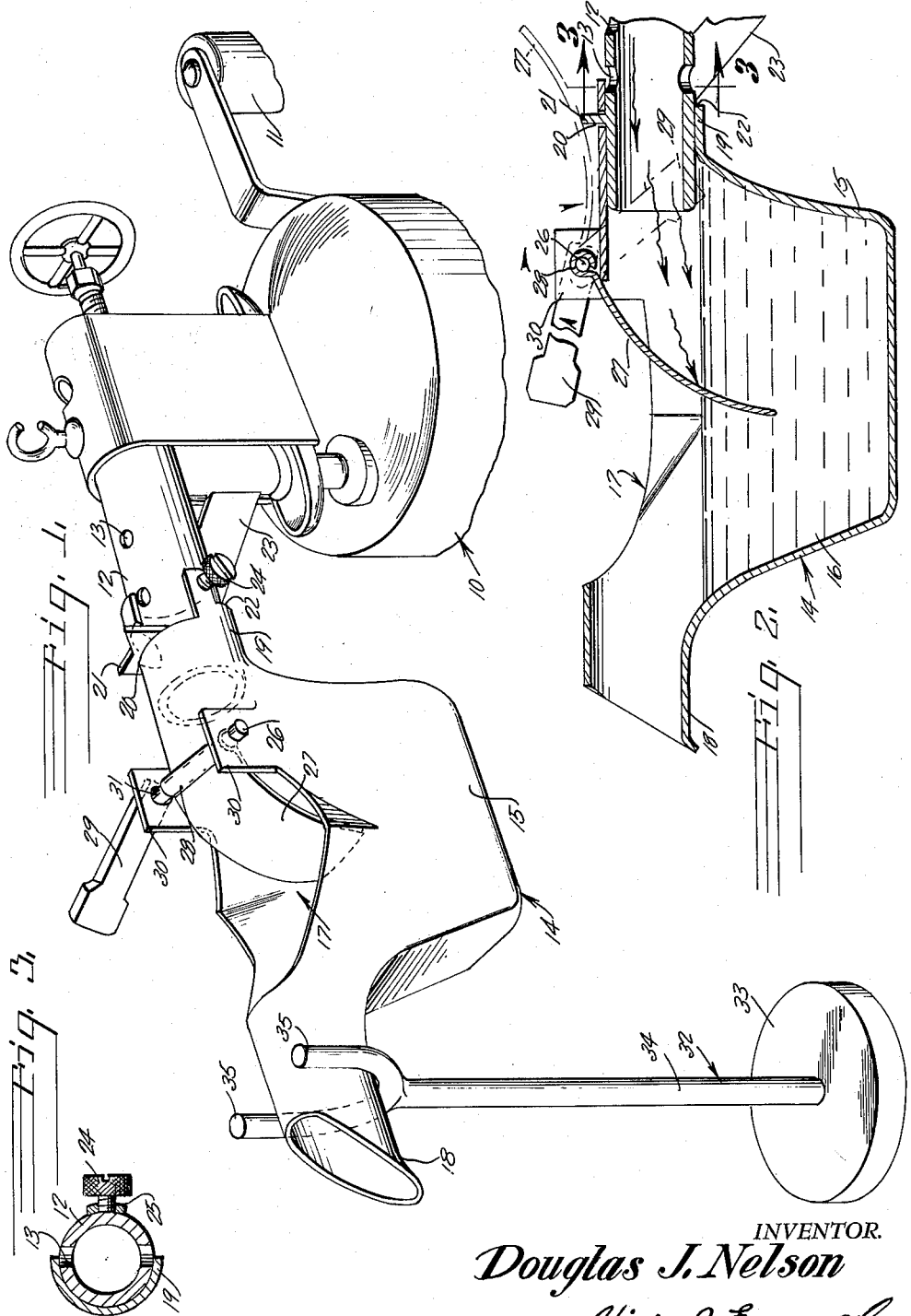
INVENTOR.
Douglas J. Nelson
BY *Victor J. Evans Co.*
ATTORNEYS

United States Patent Office 2,975,784
Patented Mar. 21, 1961

2,975,784

ACCESSORY FOR BLOW TORCH

Douglas J. Nelson, Rte. 2, Box 115, Portland, Oreg.

Filed June 30, 1958, Ser. No. 745,629

2 Claims. (Cl. 126—240)

This invention relates to a blowtorch, and more particularly to a melting pot for attachment to a blowtorch.

The object of the invention is to provide a pot which is adapted to be connected to a conventional blowtorch whereby lead or other fusible material can be readily heated or melted by means of the heat generated by the blowtorch.

Another object of the invention is to provide a melting pot which can be readily attached to or detached from a blowtorch, and wherein the heat from the blow torch can be used for melting lead or other material in the pot, and wherein the melted material can be conveniently poured from a spout on the pot.

A further object of the invention is to provide a blow gun or blowtorch melting pot which is extremely simple and inexpensive to manufacture.

Other objects and advantages will be apparent during the course of the following description.

In the accompanying drawings, forming a part of this application, and in which like numerals are used to designate like parts throughout the same:

Figure 1 is a perspective view illustrating the melting pot of the present invention attached to a blowtorch.

Figure 2 is a vertical sectional view taken through the melting pot.

Figure 3 is a sectional view taken on the line 3—3 of Figure 2.

Referring in detail to the drawings, the numeral 10 indicates a portion of a conventional blowtorch which includes the usual handle 11 and barrel 12, and the barrel 12 may be provided with spaced apart openings 13.

The present invention is directed to an accessory for use with the blowtorch 10, and the accessory is in the nature of a melting pot which is indicated generally by the numeral 14. The melting pot 14 includes a main body portion 15 which is adapted to be used for holding or handling material such as the fusible material 16 which may be lead or the like. The upper portion of the pot 14 is open as at 17.

Extending from one end of the pot 14 is a discharge spout or pouring spout 18. The other end of the pot is provided with a collar 19 which is adapted to slip over the barrel 12. The collar 19 is provided with a slot 20 that is adapted to receive therein a bracket 21 which projects upwardly from the barrel 12, and the bracket 21 is adapted to be used as a support for a soldering iron. The lower portion of the collar 19 is cut away as at 22 so as to provide clearance for the usual brace 23 that is secured beneath the barrel 12. The numeral 24 indicates a set screw which extends through an opening 25 in the collar 19, and the set screw 24 is adapted to be used for helping to retain the melting pot connected to the barrel 12.

Extending upwardly from the pot 14 and secured thereto or formed integral therewith is a pair of spaced parallel vertically disposed ears 30, and a shaft 26 extends between the ears 30. The numeral 27 indicates a curved deflector which has a rolled end portion 28 that is rigidly secured to the shaft 26 between the ears 30. A weighted lever 29 is connected to an end of the shaft 26. The deflector 27 can be moved from the solid line position shown in Figure 2 to the broken line position shown in Figure 2, as later described in this application. Suitable spacer members 31 may be arranged contiguous to the inner surfaces of the ears 30.

There is further provided a supporting stand which is indicated generally by the numeral 32, and the stand 32 includes a horizontally disposed base 33 which has a vertically disposed rod 34 projecting upwardly therefrom. A U-shaped support member 35 is arranged contiguous to the upper end of the rod 34, and the support member 35 engages the spout 18 as shown in Figure 1.

From the foregoing, it is apparent that there has been provided a melting pot which can be readily attached to or detached from a conventional blowtorch such as the blowtorch 10. When the melting pot 14 is to be used, the collar 19 can be readily connected to the barrel 12, and the slot 20 in the collar 19 receives the bracket 21. The bracket 21 is normally used as a support for the soldering iron. The set screw 24 is adapted to be extended through the opening 25 in the collar 19 and this set screw 24 helps maintain the melting pot connected to the barrel 12. The deflector 27 can be used for deflecting heat from the blowtorch into the pot 14 so that the material such as the material 16 can be readily melted. The melted material can be discharged or poured out through the spout 18. The stand 32 helps support the melting pot as shown in Figure 1. When desired, the deflector 27 can be swung or pivoted from the solid line position shown in Figure 2 to the broken line position shown in Figure 2, and the weighted lever 29 will maintain the deflector 27 immobile in its various rolled end positions. The deflector 27 includes the portion 28 which is rigidly secured to the shaft 26, that is pivotally mounted in the ears 30.

When the pot is being connected to the blowtorch, it is only necessary to manually twist the pot 14 so that the slot 20 will engage or receive the bracket 21. Then, the set screw 24 can be tightened to prevent the pot from accidentally twisting or moving.

The parts can be made of any suitable material and in different shapes or sizes.

Thus, it will be seen that there has been provided an attachment for a standard gas blowtorch such as the blowtorch 10 and the present invention will completely replace all of the various conventional lead melting equipment which is now used by the plumbing industry or the like.

The melting pot 14 mounts on the barrel 12 of the standard blowtorch 10 by exerting a clockwise half-turn to the pot, and the soldering iron support helps secure the pot in place. The heat reflector or deflector 27 can be moved to the solid line position shown in Figure 2 and then the blowtorch is lit. The lead melting pot 14 will quickly heat to the correct temperature and then the reflector 27 is flipped back to the broken line position shown in Figure 2. Then, the lead or other material is inserted into the pot 14 through the opening 17 and within a very short period of time, the lead will be melted and ready for use. The plumber or other user then merely has to pour the lead through the spout 18 into the joint to be sealed. The reflector 27 will not flip back into the chamber or pot 14 because of the counterweight 29.

Some of the advantages of the present invention are as follows. It is simple in structure, and it is practically indestructible since it is made of a suitable material such as iron or steel. It is small enough so that it can be conveniently carried in a tool box, and it is universal and will mount on any blowtorch. Furthermore, it will replace all other heavy, cumbersome and expensive lead melting equipment and is a time saver. The notch or recess 22 provides clearance for the usual brace 23. The spacer members 31 maintain the member 27 properly centered between the ears 30. The reflector or deflector 27 serves to reflect the flame to the bottom of the pot 14. The spout 18 can be used for pouring melted lead by tipping the blowtorch. The stand 32 helps support the lead pot.

Minor changes in shape, size and rearrangement of details coming within the field of invention claimed may be resorted to in actual practice, if desired.

I claim:

1. In a blowtorch including a barrel through which the heating flame of the blowtorch will pass, a bracket extending upwardly from said barrel, an inclined brace secured to the undersurface of said barrel and to the blow torch, a melting pot including a main body portion having its upper end provided with an opening, a pouring spout on one end of the pot, a collar on the other end of said pot for engagement with said barrel, a set screw extending through said collar and engaging said barrel, there being a slot in said collar for receiving the bracket on said barrel, the lower portion of the collar being cut away to provide clearance of the brace, a pair of vertically disposed spaced parallel ears extending upwardly from said pot, a shaft pivotally mounted in said ears, a weighted lever connected to an end of said shaft, a curved deflector having a rolled end portion rigidly secured to said shaft and positioned forwardly of and adjacent the forward end of said barrel, so that said deflector will deflect the heating flame passing through the barrel into the main body portion of the melting pot, and a stand including a base, a vertically disposed rod extending upwardly from said base and terminating in an upper U-shaped support member for engagement with said spout.

2. In a blowtorch attachment, a melting pot including a main body portion having an opening in its upper end, a pouring spout on one end of the pot, a collar on the other end of said pot for connecting the pot to a blowtorch, a set screw extending through said collar and engageable with a blowtorch for retaining the pot in fixed relation to a blowtorch, there being a slot in said collar for receiving a portion of a blow torch, the lower portion of said collar being cut away for receiving another portion of a blowtorch, a pair of vertically disposed spaced parallel ears extending upwardly from said pot, a shaft extending between said ears, a weighted lever connected to an end of said shaft, and a curved deflector having a rolled end portion rigidly secured to said shaft and adapted to be positioned forwardly of and adjacent the forward end of a blowtorch to deflect a heating flame passing outwardly of a blowtorch into the melting pot.

References Cited in the file of this patent

UNITED STATES PATENTS

| Number | Name | Date |
|---|---|---|
| 169,439 | Hayes | Nov. 2, 1875 |
| 303,316 | North | Aug. 12, 1884 |
| 576,282 | Smith | Feb. 2, 1897 |
| 1,108,436 | Johnston | Aug. 25, 1914 |
| 1,201,497 | Peschman | Oct. 17, 1916 |
| 1,237,460 | Bishop | Aug. 21, 1917 |
| 1,315,420 | Romano | Sept. 9, 1919 |
| 1,401,514 | Blake | Dec. 27, 1921 |
| 1,432,801 | Streit | Oct. 24, 1922 |
| 1,562,047 | Peterson | Nov. 17, 1925 |
| 1,586,472 | Rochford | May 25, 1926 |
| 1,750,846 | Lambert | Mar. 18, 1930 |
| 1,853,193 | Bicknell | Apr. 12, 1932 |
| 2,030,238 | Brown | Feb. 11, 1936 |
| 2,152,446 | Temple | Mar. 28, 1939 |
| 2,270,625 | Dilts | Jan. 20, 1942 |
| 2,327,677 | Starbuck | Aug. 24, 1943 |
| 2,672,924 | Anthes | Mar. 23, 1954 |